United States Patent [19]

Kawai

[11] 4,126,388
[45] Nov. 21, 1978

[54] ELECTROPHOTOCOPYING MACHINE OF ELECTROSTATIC LATENT IMAGE TRANSFER TYPE

[75] Inventor: Yoshihisa Kawai, Atsumi, Japan

[73] Assignee: Minolta Camera Kabushiki Kaisha, Osaka, Japan

[21] Appl. No.: 775,928

[22] Filed: Mar. 9, 1977

[30] Foreign Application Priority Data

Mar. 15, 1976 [JP] Japan ........................................ 28330

[51] Int. Cl.² ..................... G03B 27/00; G03G 15/00; G03B 27/54
[52] U.S. Cl. ....................................... 355/1; 355/3 R; 355/67
[58] Field of Search ................. 355/1, 3 R, 3 CH, 14, 355/67, 70

[56] References Cited

U.S. PATENT DOCUMENTS

| | | | |
|---|---|---|---|
| 3,643,014 | 2/1972 | Rosenberg et al. | 355/3 R X |
| 3,730,709 | 5/1973 | Kinoshita et al. | 355/3 R X |
| 3,778,148 | 12/1973 | Fijitsuka et al. | 355/14 X |
| 3,955,888 | 5/1976 | Kakiuchi et al. | 355/1 |
| 3,997,262 | 12/1976 | Doi et al. | 355/3 R X |
| 4,050,802 | 9/1977 | Tanaka et al. | 355/3 R |

Primary Examiner—Fred L. Braun

[57] ABSTRACT

An electrophotocopying machine of the electrostatic latent image transfer type employing as a device for projection of images of original documents onto a photosensitive drum an optical fiber device which has a short focal length and permits efficient exposure of a narrow area of the photosensitive drum whereby the drum diameter can be small and machine height may be reduced. The electrophotocopying machine also occupies less area and makes efficient use of electrical power because use is made of a portion of a charging unit area to transmit image light to the photosensitive drum and use is also made of light from the document illumination device to erase the charge on the drum.

7 Claims, 14 Drawing Figures

ELECTROPHOTOCOPYING MACHINE OF ELECTROSTATIC LATENT IMAGE TRANSFER TYPE

The present invention relates to an electrophotocopying machine wherein copies of original documents are produced by an electrostatic latent image transfer process. More particularly the invention relates to a photocopying machine having a construction which makes the machine compact and of optimum size for use as a desk-top photocopying machine.

Small electrophotocopying machines are intended to be employed on an office-desk, and for convenience of operation thereof by a standing person the height of the working surface of the machine, i.e., the height of the document support on which documents to be copied are placed, is suitably 600–1,000 mm from the ground. Since the height of a normal office desk is on the order of 700–800 mm, the height of the working surface of the photocopying machine above the base thereof, referred to hereinafter as the height of the photocopying machine, since the working surface is normally level or approximately level with the upper surface of the photocopying machine, should be less than about 250 mm. However, the height of currently marketed small photocopying machines in in the range 300–350 mm, and for easy operation of what are called desk-top photocopying machines, the machines must be placed on special stands, which are lower than normal desks, and which constitute extra items of furniture which must be accommodated in an office, thus off-setting the advantage of having small photocopying machines.

A principal reason for a conventional photocopying machine being large in size is that the optical lens system employed therein for projection of the image of an original document requires a long path to a photosensitive medium for formation of a latent image of the document and subsequent powder image transfer onto copy paper material. Although a document to be copied is normally moved so that successive portions thereof are brought into line with an image projection station and the lens system needs only to be able to project a comparatively narrow band of light carrying the image of the portion of the original document which is currently in line with the projection station, since it is necessary for the lens system to accurately focus onto the photosensitive material of light coming from the entire width of the original document, it is not possible to employ a small lens system, because of the limited angle of view thereof. However, a lens system which is large enough to accept light from the entire width of an original document has a correspondingly long focal length. Therefore, the length of the optical path from the original document to the photosensitive material also must be long, since even for 1:1 magnification of photocopies with respect to original documents, which requires a minimum optical path length, the optical path length must be equal to four times the focal length of the optical lens system. Even if use is made of reflecting mirrors, etc., to achieve the requisite optical path length, space requirements for the photocopying machine are large, and of course employment of mirrors itself makes construction and adjustment of the machine more complicated and difficult.

With respect to the type of copy paper to be employed, although production of photocopies by the so-called xerographic process is the most advantageous with respect to picture quality of copies, the use of toner particles necessitates extra items of equipment, such as a toner supply hopper, a brush or similar means for cleaning the photosensitive material, etc., and thus makes it extremely difficult to achieve compactness in a photocopying machine. In contrast to this, the so-called electrofax system does not require the above-mentioned extra items, although it makes copies by direct development of electrostatic latent images formed on photosensitive paper. However, the copy paper employed in such system is thick and difficult to write thereon by hand since the copy paper is coated with the photosensitive material. Accordingly, such a copying machine cannot always meet the needs of users, although such a machine may be compact. Thus, for a small photocopying machine the photosensitive material employed is suitably material which permits production of photocopies by the electrostatic latent image transfer method, thus avoiding the disadvantages of the other methods noted above. Such material may be in the form of a belt which is driven round a generally rectangular, circular path. However, overall space requirements for such a belt are large, making it difficult to achieve compactness, and such a belt is preferably used in large photocopying machines. The preferred form of photosensitive material in small photocopying machines is a drum, which, being circular in cross-section, occupies less space than a photosensitive belt or similar means. However, in conventional copiers the diameter of the photosensitive drum must be large, for reasons described below in reference to FIG. 1.

In FIG. 1 there is shown schematically an original document X the image of which is to be focussed by an optical lens means 1 onto a photosensitive drum 14 having a small diameter. The image of a point A near the edge of the original document X is projected by the lens means 1 to a point exterior to the drum 14, i.e., the point A cannot be recorded on the drum 14. The furthest point from the center of the original document the image of which can be projected onto the surface of the drum 14 is point B, the image of which is recorded at point B′ on the drum 14 by light which is more or less tangential to the drum periphery. In any drum such as drum 14 this results in the area occupied by the point B′ being greater than the area occupied by the point B on the original document. The main increase in area is elongation along a line followed by the periphery of the drum, and subsequent transfer of the image of the point B′ onto a sheet of copy paper results in a distorted image. It is convenient to express the amount of distortion $\Delta a$ in terms of the elongation of the point B′ with respect to the point B. To avoid projection onto the drum 14 of light rays which are almost tangential thereto it is known to provide between the original document X and the drum 14 an opaque board 2 having defined therein a slit 2a which permits passage therethrough and projection onto the drum 14 of only a narrow band of image-carrying light coming from the original document, whereby the area of the drum 14 exposed is comparatively flat, successive portions of the document X being moved past the slit 2a while the drum 14 is rotated at a corresponding speed. In this case, designating the slit width as S and the radius of the drum 14 as r, the maximum distortion $\Delta a$ which can occur, i.e., the distortion of images produced by light passing through the slit 2a immediately adjacent to the edge thereof, is $$(S/2)^2 = r^2 - (r - \Delta a)^2$$

or, $$(S/2)^2 = \Delta a(2r - \Delta a) \qquad (1)$$

From this, since $r$ is normally much greater than $\Delta a$, one obtains an approximation as follows, $$\Delta a = (S/2)^2/2r \qquad (2)$$

In other words, distortion becomes greater as the width of the slit is made greater or as the radius of the drum 14 is made smaller. The tolerance of distortion also becomes greater as the aperture of the lens means becomes greater, and it is therefore possible to reduce the diameter of the drum 14 and still maintain a given quality of picture by employing a lens with less light-gathering ability or making the slit 2a narrower. In this case, however, in order to ensure efficient exposure of the drum 14 it is necessary either to increase the intensity of illumination, which requires a larger illumination means occupying more space, or to move the original document X and drum 14 more slowly, which results in longer time being required to obtain copies.

Decreasing the diameter and thus increasing the curvature of the drum surface also results in undesirable effects in the direction of the width of a copy, as may be appreciated from FIG. 2, which shows the trace of document image points C, D, E, F and G which have been projected through the slit 2a onto the drum 14. Along the tangential line contacting the image-formation plane and the drum 14, the points C, D, E, F and G are correctly positioned in correspondence to the respective points on the original document, but in other locations there is distortion $\Delta b$ which increases the further the location is away from the center of the image towards opposite sides of the image, and which is determined by the radius of the drum, the length of the slit and the angle of view of the lens means. In addition to this, optical characteristics of a lens are such that there is a decrease in the quality of that portion of a picture which is produced by marginal light rays, and because of this when a slit board 2 having defined therein a parallel-sided slit 2a as shown in FIG. 3(a) is employed, the amount of distortion $\Delta b$ produced at the edges of an image is considerable compared with the center. Therefore, to make picture quality more even it is necessary to employ a board in which the slit 2b is wider at the center than at opposite ends thereof, as shown in FIG. 3(b).

An optical lens means also presents problems with respect to the amount of transmitted light and hence efficiency and evenness of illumination of the drum 14, the amount of transmitted light being greater at the center of the lens means, as indicated by the curve 4(a) of FIG. 4. To counter this, it is known to employ a slit board having defined therein a slit 2c which, as shown in FIG. 3(c), has the opposite ends wider than the center thereof, illumination through the slit 2c thus being representable by the curve 4(b) of FIG. 4, which compensates for the curve 4(a) of FIG. 4 and results in generally even illumination of the drum 14. However, this form of slit is the opposite of the form shown in FIG. 3(a) required in order to achieve even picture quality. Alternatively, it has been known to provide illumination means at positions corresponding to opposite ends of the slit, in order to increase illumination thereat. Theoretically this should give the smooth curve 4(c) of FIG. 4, with maximum illumination at opposite ends of the slit and decreasing steadily towards the center. In fact, however, width effects of the light sources appear, and the distribution curve of illumination of an original document dips suddenly over the central portion of an illuminated band thereof, as indicated by curve 4(d) of FIG. 4, with the result that compensation for the curve 4(a) fails to be achieved. In addition, of course, extra illumination means increases the cost of a photocopying machine and also requires more space. Because of these various considerations, as well as it being necessary to provide space for a long optical path in a conventional photocopying machine, it is also necessary to employ a comparatively large diameter drum as a photosensitive medium, a diameter of about 60 mm being the lowest permissible limit.

It is accordingly a principal object of the invention to provide a desk-top photocopying machine which has a height of only 100-250 mm and may therefore be easily employed when supported on a standard office desk.

It is another object of the invention to provide a desk-top photocopying machine which has a compact construction and occupies less horizontal space on an office desk and the assembly and maintenance of which may be easily effected.

In achieving these and other objects there is provided, according to the present invention, a photocopying machine in which the document image projection means is constituted by an image transmitter formed by a bundle of optical fibers having graded refractive indexes, which image transmitter will be referred to as an image transmitter hereinafter, and in combination may effect substantially even transmission of light and accurately focus an image of an original document in a narrow band, whereby use of a small diameter drum is made possible and the photocopying machine may be made smaller in height. In the machine of the invention, an electrostatic latent image of an original document is first produced on the surface of a charged photosensitive drum, then this electrostatic latent image is transferred onto a sheet of copy paper brought into pressure contact with the drum, after which the image on the copy paper is developed, by toner particles for example, and fixed. Thus, there is the advantage of the high picture quality achieved by use of a xerographic photocopying process, but there is no need for provision of cleaning means for removal of toner particles from the drum and of developing means for the drum. Also, since the drum employed is small in diameter and therefore has a high degree of curvature, copy paper, which is comparatively stiff, comes naturally out of contact with the drum after transfer of an image, and there is therefore no need for provision of stripper elements, which are liable to damage the surface of the drum. Further, according to the invention, image-carrying light for exposure of the electrophotosensitive drum is directed through a portion of the area occupied by a unit for charging the drum, and subsequent to image transfer the charge is removed from the drum by the same source that is employed for illumination of original documents, whereby further compactness, particularly in terms of plane area, is achieved.

A better understanding of the present invention may be had from the following full description of several preferred embodiments thereof when read in reference to the attached drawings, in which like numbers indicate like parts, and in which:

FIGS. 1 through 4 are drawings referred to in the foregoing description, FIG. 1 being a schematic side view of the manner of exposure of a photosensitive drum by means of a conventional optical lens means, FIG. 2 being a schematic drawing showing distortion which occurs along the length of an exposure-light restriction slit employed in conventional photocopying machines, FIG. 3 being a plan view showing types of light-restriction slits employed in conventional means, and FIG. 4 being a plot of various illumination distribution curves applying to conventional means;

Figure 8:
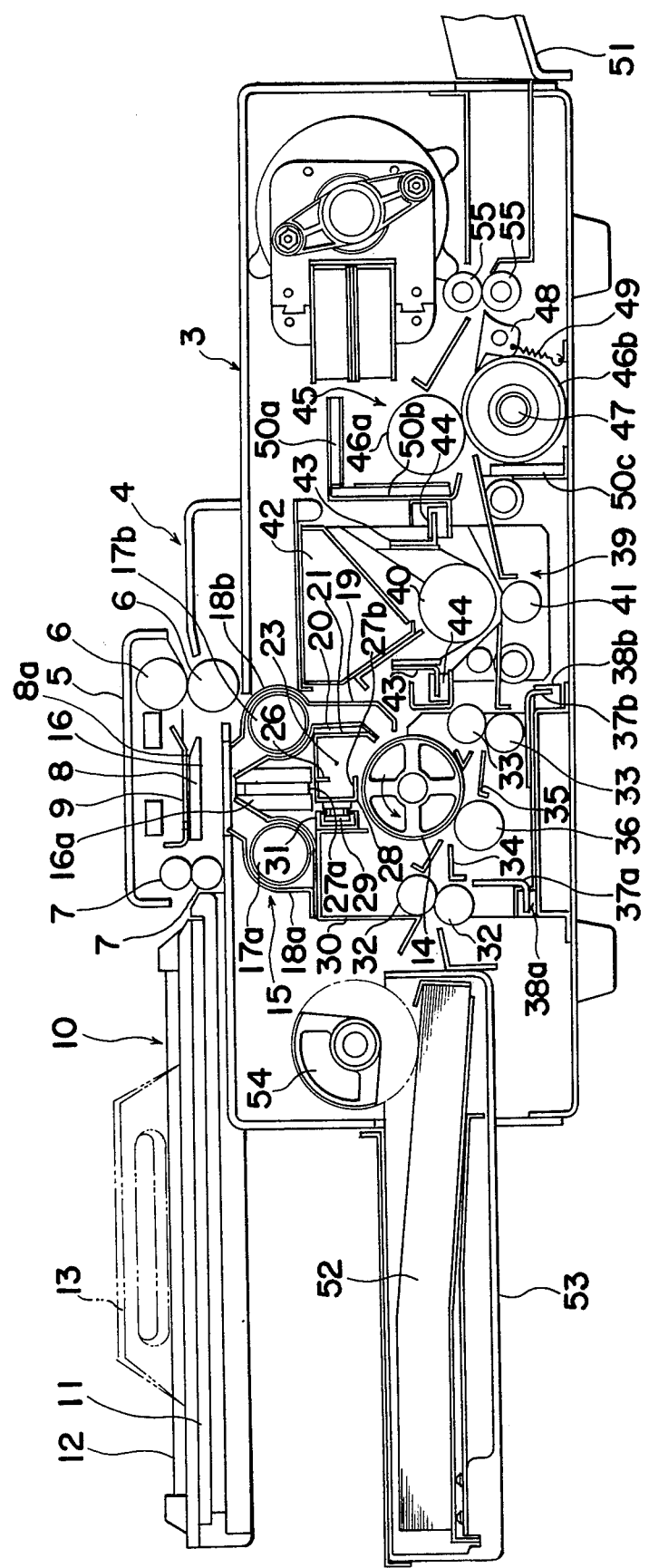
FIG. 8 is a cross-sectional view of a photocopying machine according to a first embodiment of the invention.
Figure 9:
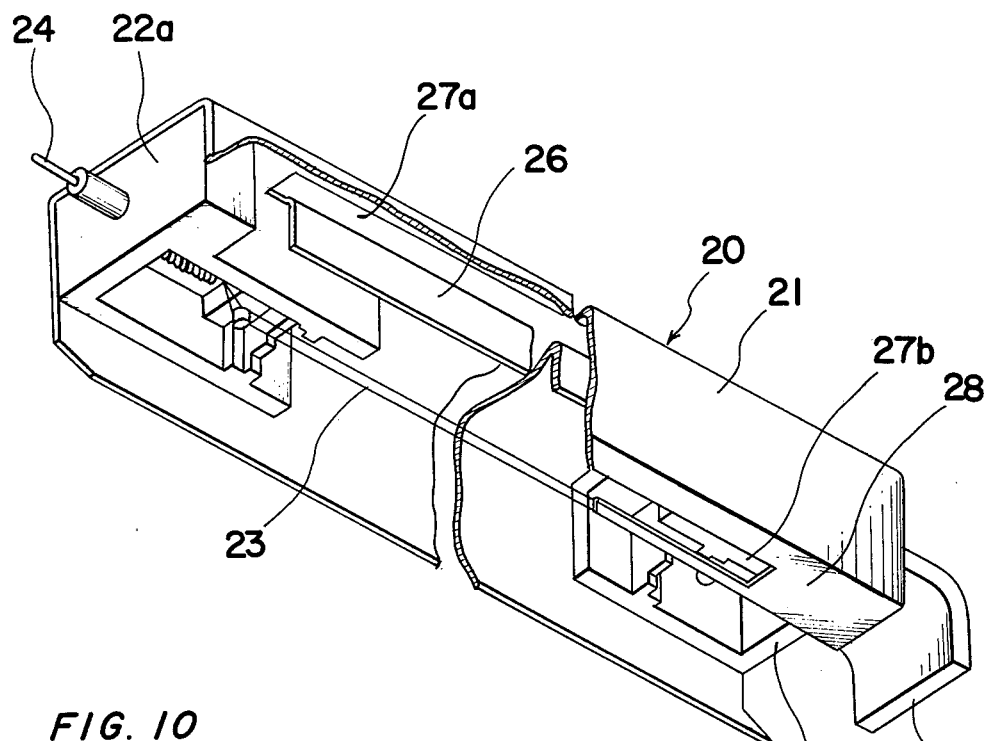
Figure 11:
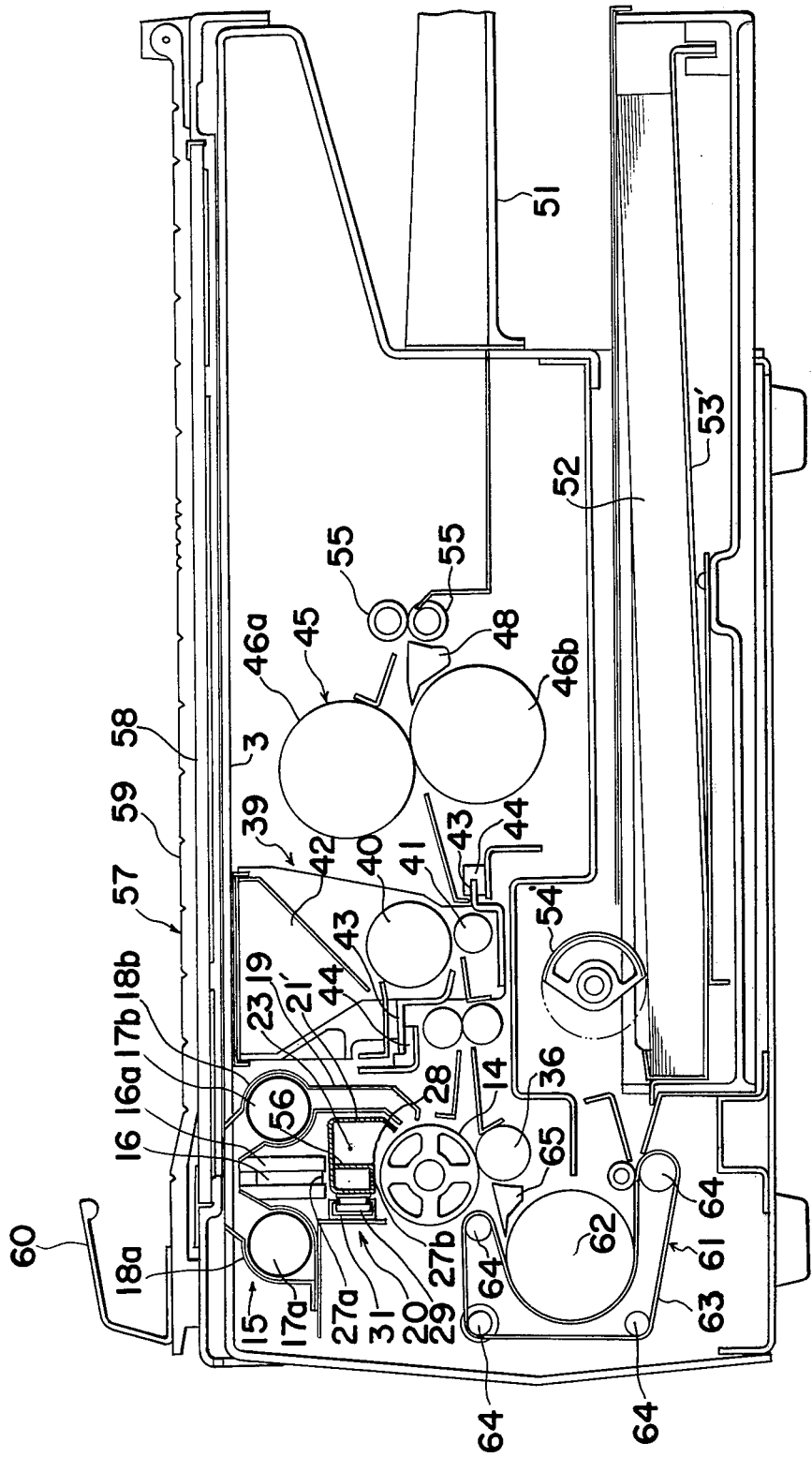
Figure 12:
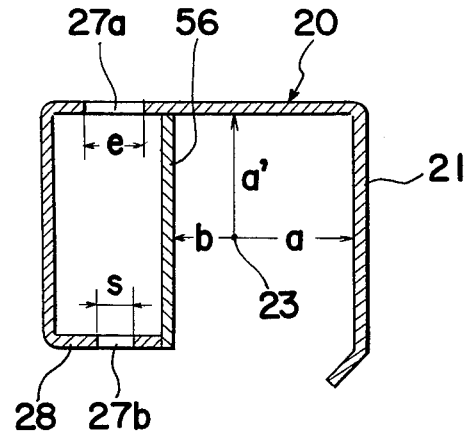
Figure 13:
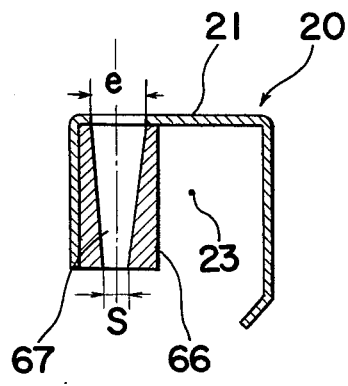
Figure 14:
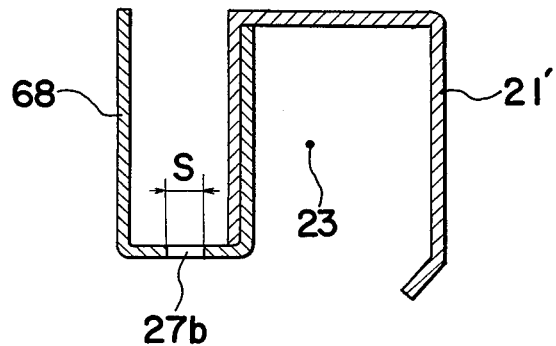

FIGS. 9, 10(a) and 10(b), are detailed views of a drum charging unit employed in the machine of FIG. 8;

FIG. 11 is a cross-sectional view of a photocopying machine according to a second embodiment of the invention;

FIG. 12 is a detail view of a drum charging unit employed in the machine of FIG. 11; and FIGS. 13 and 14 are detail views of modifications of drum charging units according to the invention.

Figure 1:
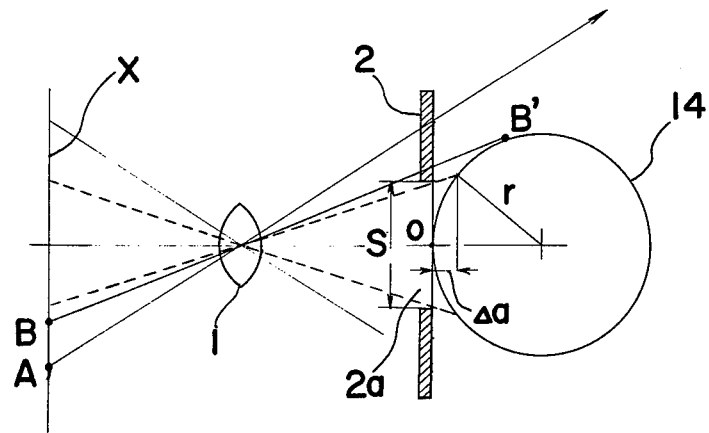
Figure 2:
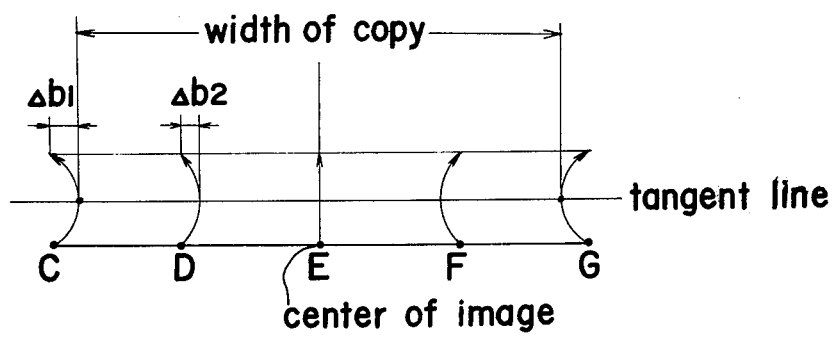
Figure 3:
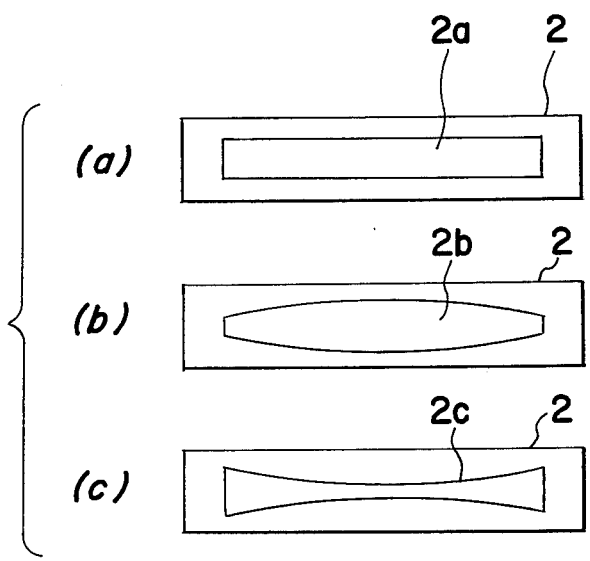
Figure 4:
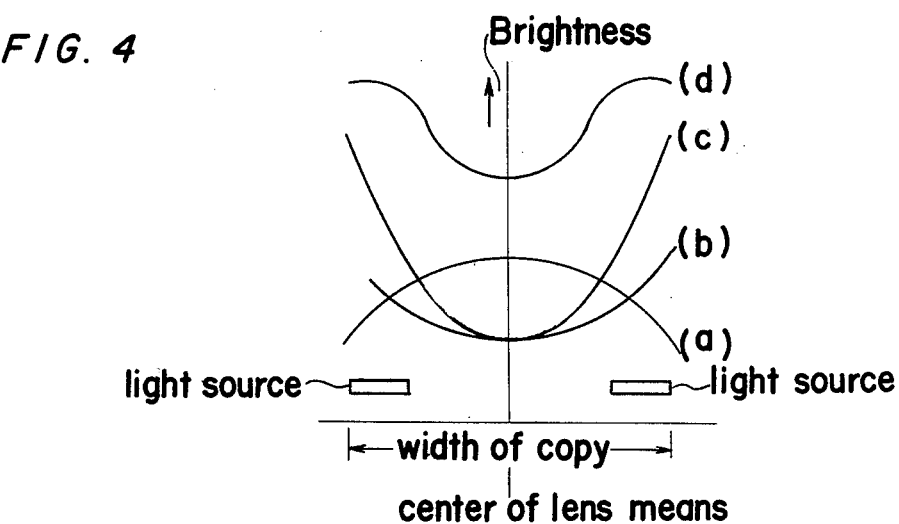
Figure 5:
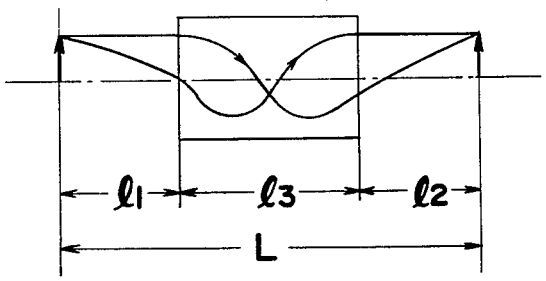
FIG. 5 is a schematic cross-sectional view showing the path of light through an optical fiber element.

Referring to FIG. 5 an image transmitter formed by a bundle of optical fibers having graded refractive indexes, which is preferably employed in the means of the invention, has a refractive index which is greatest in the central portion thereof and decreases parabolically from the center towards either end thereof. The overall optical path length L through such an element is easily adjusted by employment of an image transmitter having different refraction indexes or lengths. However, if the length of the optical path is made too short, efficient illumination of photosensitive elements by the image transmitter becomes difficult to achieve, and if the optical path length through the image transmitter is made too long there is liable to be poorer contrast of produced images, in addition to which a long optical path length does not meet the object of the invention to provide a compact photocopying machine. In consideration of these points, preferred embodiments of the invention described in detail below employ an image transmitter in which the lengths 11 and 12 of the end portions are equal to one another and are each about 20 mm, and the length 13 of the central portion of the image transmitter is about 25 mm, giving an overall length of about 65 mm.

Figure 6:
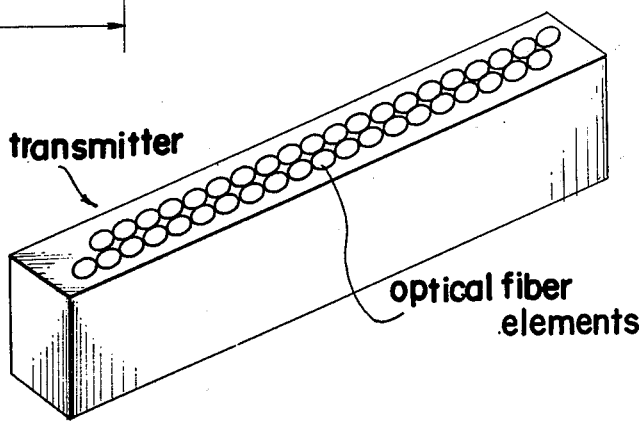
FIG. 6 is a perspective view of an image transmitter.

Referring to FIG. 6, as image projection means in the apparatus of the invention there is employed a unit constituted by two rows of optical fiber elements, the optical fiber elements of one row being staggered with respect to those of the other row. With this arrangement, for a greater width of copy it is simply necessary to provide an increased number of optical fiber elements in each row, thus overcoming the problem associated with optical lenses that, in order to project a greater width of an original document, it is necessary to provide a larger lens and therefore to make available space for a greater focal path length.

Figure 7:
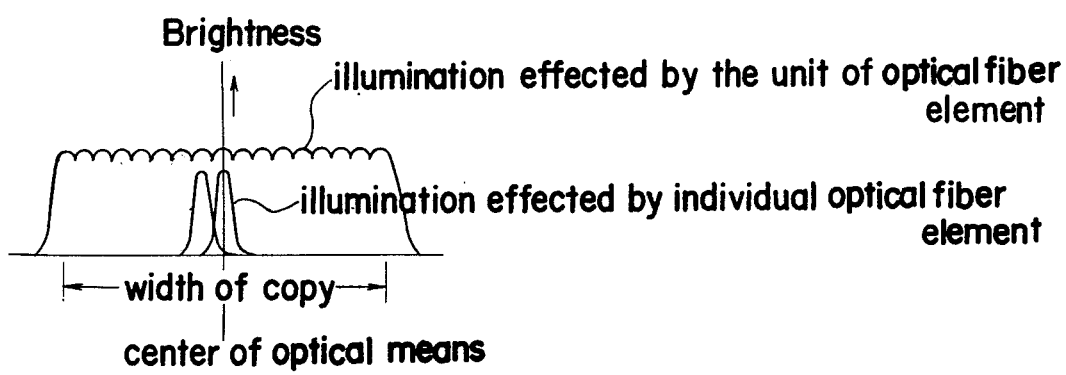
FIG. 7 is a schematic view showing illumination distribution effected by the unit of FIG. 6.

As shown in FIG. 7, the curve of illumination effected by individual optical fiber elements is highly peaked, and however long the unit of FIG. 6 is made the illumination efficiency of the unit is almost even over the entire length thereof, since the illumination curves of adjacent elements overlap, and the unit is therefore not subject to edge effects such as are present in optical lenses. Because of this efficiency of transmission of light, and hence of focussing, efficient exposure of a very narrow band of photosensitive material may be achieved, and it is therefore permissible to use a photosensitive drum with a very small diameter, on the order of 20–60 mm. Thus, the sum of the total necessary optical path length and drum diameter in the present invention is on the order of only 85–125 mm, and by suitable disposition of other elements, in a manner described below, the height of the photocopying machine is easily kept within the optimum range of 100–250 mm which is optimum for a desk-top photocopying machine.

Reference is now had to FIG. 8 which shows one embodiment of the invention comprising a main housing 3 on the upper surface portion of which there is provided an original transporter 4 for thin documents, in the form of single sheets of paper for example, and a movable table 10 for thick documents, in the form of pages of a book, for example. When a copy of a thin document is required, in order to shield the document from external light a raisable cover 5 is placed over an illuminating station 8a defined at a generally central portion of a glass plate 8 mounted in the upper portion of the main housing 3, and the document is moved underneath the cover 5 and past the illuminating station 8a by a pair of rolls 6 and a pair of rolls 7 provided on opposite sides of the illuminating station, one roll in each pair of rolls being a drive roll which is rotatably mounted in the upper portion of the main housing 3 and the other roll being rotatably mounted in a lower portion of the cover 5 and being raisable together therewith. Also in the lower portion of the cover 5 there is provided a guide 9 which comes very close to the upper surface of the glass plate 8 and ensures flatness of a thin original document being moved past the illuminating station 8a when the original transporter 4 is set as shown in the drawing. In copying a thick document, this thick document is placed on a glass plate 11 which constitutes part of the movable table 10, and is pressed flat by means of a press cover 12 which is raisable or lowerable by means of a handle 13; then the original transporter 4 is moved out to the right portion of housing 3 for moving it out of the way and the movable table 10 is moved to the right for scanning the original document.

A portion of an original document at the illuminating station 8a is illuminated by illumination means 15 comprising a pair of fluorescent lamps 17a and 17b provided on opposite sides of the illuminating station 8a and associated reflectors 18a and 18b, which concentrate the light emitted by the lamps 17 at the illuminating station 8a, and the image of this portion of the document is focussed by the image transmitter 16, such as described above and which is held in a support 16a, onto a photosensitive drum 14 which is concurrently rotated at a speed such that the peripheral speed thereof is equal to the speed of movement of the original document past the illuminating station 8a.

Figure 10:
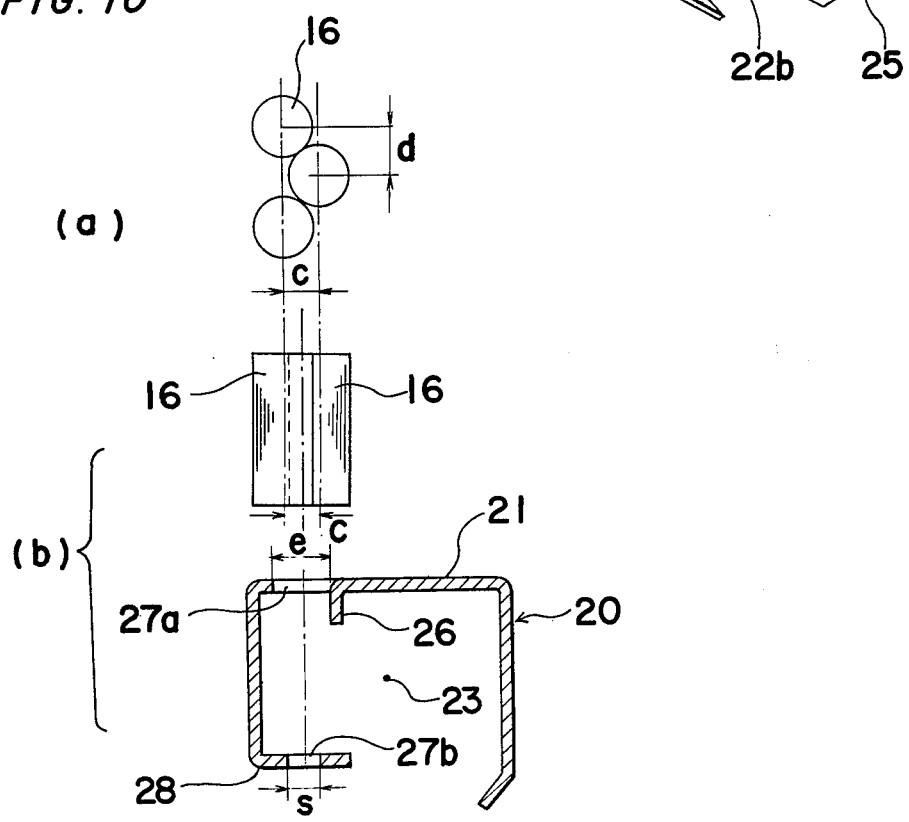

Still referring to FIG. 8 and also referring to FIGS. 9 and 10, before coming into vertical line with the illuminating station 8a each portion of the drum 14 is charged by a charging unit 20 which is so designed that maximum compactness is achieved, and comprises an electrically grounded enclosure and protection plate element 21 defining an opening adjacent to the surface of the drum 14 and having wall portions providing a mounting support for filament holders 22a and 22b between which is suspended a corona discharge filament 23. An electrode 24 is mounted on the filament holder 22a and a handle 25 is attached to holder 22b. In an upper surface portion of the plate element 21 there is defined a slit 27a and extending at an angle of 90° from the lower end of a side wall thereof there is a projection 28 in which there is defined a slit 27b, the slits 27a and 27b being in vertical alignment with one another and with the image transmitter 16 and illuminating station 8a.

As shown most clearly in FIG. 10, (a) and 10(b), the width e of the upper slit 27a is greater than the width s of the lower slit 27b, and is also greater than the center-to-center distance c between optical fiber elements in adjacent rows of the image transmitter 16. This ensures prevention of magnification of the light distribution pattern shown in FIG. 7 and unevenness of illumination due to separation of adjacent optical fiber elements in the same row by the distance d, and hence insures prevention of undesirable effects in the image produced on the drum 14.

In FIGS. 9 and 10, integrally attached to and projecting downwardly from the lower surface of the upper portion of the enclosure plate element 21 there is a shield plate 26 which is provided to prevent light emitted by the filament 23 from interfering with image-carrying light directed downwards by the image transmitter 16 through the slits 27a and 27b onto the drum 14. Application of a high voltage to the filament 23 by suitable means not shown results in temporary ionization of air inside the enclosure element 21 and consequent imposition of an electrical charge on the portion of the surface of drum 14 which is in line with the lower end opening defined by the element 21. The charging unit 20 may be removed or set in a required position by means of a guide element 29 which is fixedly attached to the enclosure element 21 and is slidable along rails which are fixedly mounted in a main frame 30.

It will be noted that although from the point of view of ensuring adequate insulation of the rest of the equipment from the corona discharge there are normally limits imposed on the degree to which the size of the enclosure element 21 may be reduced, the above described arrangement largely avoids this restriction, and by making dual use of a portion of the enclosure as insulatory space and space through which image-carrying light is directed, this portion of the photocopying machine is made much compacter than is possible in conventional equipment.

In FIG. 8, further compactness of the photocopying machine and also economy of power are achieved according to the invention by providing a light guide 19 between the lower end of the fluorescent lamp 17b and an area into line with which successive portions of the drum 14 come before coming into line with the opening defined at the lower end of the enclosure element 21. The lamp 17b therefore serves as a means for removal of charge from the drum 14 as well as for illumination of documents passing the illuminating station 8a.

In line with a generally central portion of the main housing 3 and communicating with the interior thereof there is a detachable copy paper container 53 containing copy paper 52, which may be supplied therefrom one sheet at a time by a friction roll 54. Each sheet of copy paper 52 is directed by the roll 54 into engagement with a pair of feed rolls 32 provided at an opening defined in a side wall of the frame 30, and is moved by the rolls 32 through guide elements 34 to the junction of the drum 14 and a transfer roller 36 which presses the sheet of copy paper 52 into firm contact with the drum 14, and acts to effect transfer of an electrostatic image of the content of an original document onto the copy paper 52. The drum 14 and transfer roller 36 also forward the copy paper 52 along a guide element 35 to a pair of forwarding rolls 33 which forward the copy paper 52 to a development unit 39.

To facilitate assembly and maintenance of the photocopying machine the drum 14, the rolls 32 and 33, the guide elements 34 and 35, the transfer roller 36, the illumination means 15 and the charging unit 20 are all mounted in the frame 30, and the frame 30 has affixed to the lower portion thereof guide elements 37a and 37b which are freely slidable on rails 38a and 38b fixedly mounted in the main housing 3, whereby the above-noted parts may be moved into or out of the machine as a single unit.

The development unit 39 comprises a developer sleeve 40, a hopper 42 which is provided above the developer sleeve 40 and contains toner or similar developer agent and from which developer agent is supplied onto the developer sleeve 40, and a developer roll 41, which, while forwarding the copy paper 52 along suitable guide elements to a fixing unit 45, presses the copy paper 52 into contact with the developer sleeve 40, thus resulting in transfer of the developer agent onto the copy 52 from the developer sleeve, the developer agent being caused by the force of electrostatic attraction to adhere in an image-defining pattern to the copy paper 52. The development unit 39 has affixed to opposite side portions thereof guide elements 43 which are slidable on rails 44 affixed to the main housing 3 thus permitting the unit 39 to be freely moved into or out of the main housing 3.

The fixing unit comprises a roll 46 a contacting a roll 47a in which there is provided a heater, the rolls 46a and 46b causing fusion of the developer agent on the copy paper 52 by a combination of pressure and heat. After passing through the rolls 46a and 46b, the copy paper 52 may remain in adherence to the heating roll 46b, and there is therefore provided a stripper element 48 which is loaded by a spring 49 causing the tip of the element 48 to be maintained in light pressure contact with the periphery of the roll 47b. After this the copy paper 52 is fed by rolls 55 to an output tray 51. To protect the development unit 39 from heat, insulating boards 50a, 50b, and 50c are provided above the fixing unit 45 and between the development unit 39 and the fixing unit 45.

With this construction, therefore, the image of successive portions of an original document being moved past the illuminating station 8a is focussed by the image transmitter 16 onto successive portions of the charged surface of the drum 14, whereby a corresponding electrostatic latent image is formed on the drum, and this image is subsequently transferred to and developed and fixed on a sheet of copy paper 52, and the charge on the drum 14 is removed by the charge removal unit 19.

FIGS. 11 and 12 show a second embodiment of the invention wherein the photosensitive drum 14, illumination means 15, transfer roller 36, development unit 39, and fixing unit 45 are basically the same as described above but the charging unit 20 comprises a partition wall 56 of insulator material which extends downwardly from the upper wall of the unit 20 to the lower end of projection 28 on the unit 20 and completely separates the area in which the corona diacharge filament 23 is provided from the area through which image-carrying light is directed, via the slits 27a and 27b, onto the drum 14. With this construction, if $f$ is the necessary insulatory clearance required around the filament 23, it is necessary that the distance $a'$ of the filament 23 from the top wall of the unit 20 and the distance $a$ of the filament 23 from the outer side walls of the unit 20 be greater than $f$, but since the wall 56 is made of insulator material, the distance $b$ of the filament 23 from the wall 56 may be less than $d$, and in fact may be very small, resulting in a very compact construction of the unit 20. The wall 56 also, of course, completely prevents interference with the light for exposure of the drum 14.

The original document mount portion 57 of this machine comprises a glass support 58 which is movable left and right as seen in the drawing by means not shown in order to permit scanning of successive portions of a document supported thereon, and a press cover 59, which is fitted with a handle 60 by which it may be raised, or lowered to hold an original document on the glass support 58.

Copy paper 52 provided with the photosensitive side thereof facing downwards in a receptacle 53', which is removably mounted inside the main housing 3 beneath the development unit 39 and fixing unit 45, may be moved one sheet at a time by a friction roll 54' to a copy paper reversing unit 61 comprising a belt 63 which is driven and guided by rolls 64 along a path bringing the belt 63 into close contact with one side of a roller 62 which rotates in the opposite direction to the rolls 64, each sheet of copy paper being moved onto the belt 63, to between the belt 63 and the lower end of the roller 62, being carried up to the upper end of the roller 62, whereby the photosensitive surface thereof is brought uppermost, and then being moved into engagement with the roller 36 and drum 14, the subsequent processes being as described above. To ensure separation of copy paper 52 from the roller 62 there is provided a stripper element 65, the upper surface of which also acts as a guide for directing copy paper towards the drum 14.

As noted earlier, according to the invention, the diameter of the drum 14 is in the range 20–60 mm. In the particular example shown in FIG. 11 the diameter of the drum 14 is 40 mm, the optical path length through the image transmitter 16 is 65 mm, and the height of the machine is 150 mm. In other words, the machine may be easily employed by a person standing, or even sitting, when the machine is placed on a standard office desk.

In addition to this, the machine of FIG. 11 occupies much less front-to-rear space than conventional machines, since the copy paper reversing means 61 permits the supply receptacle 53' to be provided in the lower portion of the area which must necessarily be made available for accommodation of the development unit 39 and fixing unit 45.

FIG. 13 shows a modification of the construction of the charging unit 20 in which the slits through which image-carrying light is directed by the image transmitter 16 are respectively defined by the upper and lower ends of a tapered opening formed in a block of insulator material 66 positioned at one side of the unit 20.

FIG. 14 shows another modification of the charging unit 20 in which the main portion of the unit 20 is constituted by a plate element 21' having a generally U-shaped cross-section, and image-carrying light is directed between opposite walls of an element 68, which is made of insulator material, has a generally U-shaped cross-section, has a side wall affixed to a side wall of the main plate element 21', and has a bottom wall having a slit 27b of width S.

While there has been described in the foregoing embodiment that the corona charger is constituted as a unit together with a slit portion for light image to be directed from the image transmitter onto the drum, the charger and the slit need not necessarily be integral. Specifically, the purpose of the present invention may similarly be achieved by providing the corona charger and slit member separately. Namely, the slit member which includes at least a side wall and a bottom wall having the slit portion is disposed between the image transmitter and the photosensitive drum, and the space surrounded by the image transmitter, the slit member, the photosensitive drum, the illumination means and the light guide for erasing residual charge is made as narrow as possible to allow disposition of the corona charger therein.

Although the present invention has been fully described by way of example with reference to the attached drawings, it is to be noted that various changes and modifications will be apparent to those skilled in the art. Therefore, unless such changes and modifications depart from the scope of the present invention, they should be construed as being included therein.

What is claimed is:

1. An electrophotocopying machine of the electrostatic latent image transfer type comprising,
    an illuminating station provided in the upper portion of the machine for a document to be copied;
    means for illumination of the document being provided in the illuminating station;
    a photosensitive drum having a small diameter;
    means adjacent said drum for uniformly charging the surface of the drum;
    an image transmitter formed by a bundle of optical fibers having graded refractive indexes and provided between the illuminating station and the drum for transmitting to the drum a light image corresponding to the document and directing onto the drum the light image corresponding to the document for forming an electrostatic latent image on the uniformly charged drum;
    a slit means provided between the image transmitter and the photosensitive drum for restricting the area of the photosensitive drum to which the light image is directed;
    means adjacent the drum for transferring the electrostatic latent image formed on the drum onto a copy material; and
    light passage means extending between the illumination means and a position on the drum following said transferring means for directing light from said illumination means onto said drum for erasing the residual charges on the drum;
    the image transmitter, the slit means, the photosensitive drum, the illumination means and the light passage means forming a space substantially just sufficient to accommodate the charging means therein.

2. An electrophotocopying machine as claimed in claim 1, wherein said illumination means includes a fluorescent lamp and is positioned adjacent to the image transmitter.

3. An electrophotocopying machine as claimed in claim 1, wherein said charging means and said slit means are formed as a single unit and said slit means is between the image transmitter and the drum.

4. An electrophotocopying machine of the electrostatic latent image transfer type comprising, an illuminating station provided in the upper portion of the machine for a document to be copied;

means for illumination of the document being provided in the illuminating station and including a fluorescent lamp as a light source;

a photosensitive drum having a diameter in the range of 20 to 60 mm;

a corona charger for uniformly charging the surface of the drum and a slit portion for restricting the area of the drum to which light is directed, said corona charger and said slit portion being a single unit adjacent said drum;

an image transmitter formed by a bundle of optical fibers having graded refractive indexes and provided between the illuminating station and the drum for transmitting to the drum a light image corresponding to the document and directing the light image onto the drum for forming an electrostatic latent image on the uniformly charged drum;

means adjacent the drum for transferring the electrostatic latent image formed on the drum onto a copy material; and light passage means having one end at the illuminating station and the other end extending to a position around the drum following said transferring means in the direction of rotation of said drum for erasing the residual charges on the drum when said illumination means is lit during the copying operation;

the image transmitter, the drum, the illumination means the the light passage means forming a space substantially just sufficient to accommodate the corona charger and slit portion therein with the slit portion between the image transmitter and the drum.

5. An electrophotocopying machine as claimed in claim 4, wherein said corona charger has an upper frame, a side frame and a lower frame formed integrally with the side frame and facing the drum, said upper and lower frames having slits therein between the image transmitter and the drum respectively and constituting said slit portion.

6. An electrophotocopying machine as claimed in claim 4, further comprising a dielectric material disposed between said slit portion and said corona charger for shielding the slit portion from the corona charger.

7. An electrophotocopying machine as claimed in claim 4, wherein said light passage means is a hollow light guide and the light from the fluorescent lamp reaches the drum by reflection from the interior surface of the hollow light guide.

* * * * *